(12) United States Patent
Pope et al.

(10) Patent No.: US 9,300,599 B2
(45) Date of Patent: Mar. 29, 2016

(54) PACKET CAPTURE

(71) Applicant: SOLARFLARE COMMUNICATIONS, INC., Irvine, CA (US)

(72) Inventors: Steve L. Pope, Costa Mesa, CA (US); David J. Riddoch, Fenstanton (GB); Martin Porter, Over (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 73 days.

(21) Appl. No.: 14/291,741

(22) Filed: May 30, 2014

(65) Prior Publication Data

US 2014/0355613 A1  Dec. 4, 2014

Related U.S. Application Data

(60) Provisional application No. 61/829,145, filed on May 30, 2013.

(51) Int. Cl.
*H04L 12/931* (2013.01)
*H04L 12/26* (2006.01)

(52) U.S. Cl.
CPC .............. *H04L 49/20* (2013.01); *H04L 43/026* (2013.01); *H04L 43/0852* (2013.01)

(58) Field of Classification Search
None
See application file for complete search history.

(56) References Cited

U.S. PATENT DOCUMENTS

| 5,272,599 | A  | 12/1993 | Koenen |
| 5,325,532 | A  | 6/1994  | Crosswy et al. |
| 5,946,189 | A  | 8/1999  | Koenen et al. |
| 6,098,112 | A  | 8/2000  | Ishijima et al. |
| 6,160,554 | A  | 12/2000 | Krause |
| 6,304,945 | B1 | 10/2001 | Koenen |

(Continued)

FOREIGN PATENT DOCUMENTS

| EP | 620521 A2 | 10/1994 |
| WO | 0148972 A1 | 7/2001 |

(Continued)

OTHER PUBLICATIONS

Gordon E. Moore; "Cramming more components onto integrated circuits," Electronics, vol. 38, No. 8, 4 pages, Apr. 1, 1965.

(Continued)

*Primary Examiner* — Benjamin H Elliott, IV
(74) *Attorney, Agent, or Firm* — Haynes Beffel & Wolfeld LLP; Warren S. Wolfeld

(57) ABSTRACT

Roughly described, a network interface device for connection between a host data processing device and a network, comprising: a controller for supporting communication with a host data processing device over a data bus interface; and a packet capture unit between the controller and the network and comprising: a packet inspector configured to parse incoming data packets to identify data packets of a first data flow; a duplication engine to generate a duplicate data flow from the first data flow; and a packet capture engine to process said duplicate data flow into a packet capture data stream having a predefined format. The network interface device is configured to cause: the first data flow to be made available to a consumer process of a host data processing device to which the network interface device is connected; and the processed packet capture data stream to be stored at a packet capture buffer.

33 Claims, 3 Drawing Sheets

(56) References Cited

U.S. PATENT DOCUMENTS

| | | | |
|---|---|---|---|
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,636,703 B2 | 12/2009 | Taylor |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,702,629 B2 | 4/2010 | Cytron et al. |
| 7,757,232 B2 | 7/2010 | Hilland et al. |
| 7,778,194 B1 | 8/2010 | Yung |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,945,528 B2 | 5/2011 | Cytron et al. |
| 7,954,114 B2 | 5/2011 | Chamberlain et al. |
| 7,978,606 B2 | 7/2011 | Buskirk et al. |
| 8,000,336 B2 | 8/2011 | Harel |
| 8,116,312 B2* | 2/2012 | Riddoch .............. H04L 49/90 370/389 |
| 8,134,927 B2* | 3/2012 | Gamage .............. H04L 43/106 370/241 |
| 8,156,101 B2 | 4/2012 | Indeck et al. |
| 8,326,816 B2 | 12/2012 | Colle et al. |
| 8,817,784 B2* | 8/2014 | Riddoch .............. H04L 49/90 370/389 |
| 9,083,539 B2* | 7/2015 | Riddoch .............. H04L 12/18 |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0145981 A1* | 10/2002 | Klinker .............. H04L 12/5695 370/244 |
| 2002/0156784 A1 | 10/2002 | Hanes et al. |
| 2003/0007165 A1 | 1/2003 | Hudson |
| 2003/0033588 A1 | 2/2003 | Alexander |
| 2003/0055883 A1 | 3/2003 | Wiles |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0086300 A1 | 5/2003 | Noyes et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0015502 A1 | 1/2004 | Alexander et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210713 A1* | 10/2004 | Kanai .............. G06F 3/0607 711/113 |
| 2004/0210754 A1 | 10/2004 | Barron et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0081471 A1* | 4/2007 | Talley, Jr. .............. H04L 43/028 370/252 |
| 2007/0153782 A1 | 7/2007 | Fletcher et al. |
| 2007/0183418 A1* | 8/2007 | Riddoch .............. H04L 49/90 370/389 |
| 2007/0188351 A1 | 8/2007 | Brown et al. |
| 2007/0220183 A1 | 9/2007 | Kagan et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0060197 A1 | 3/2009 | Taylor et al. |
| 2009/0165003 A1 | 6/2009 | Jacobson et al. |
| 2009/0182683 A1 | 7/2009 | Taylor et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0088437 A1 | 4/2010 | Zahavi |

(56) References Cited

U.S. PATENT DOCUMENTS

| | | | |
|---|---|---|---|
| 2010/0138840 A1 | 6/2010 | Kagan et al. | |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0195538 A1* | 8/2010 | Merkey | H04L 43/02 370/255 |
| 2010/0198850 A1 | 8/2010 | Cytron et al. | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0040701 A1 | 2/2011 | Singla et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |
| 2011/0178917 A1 | 7/2011 | Parsons et al. | |
| 2011/0178918 A1 | 7/2011 | Parsons et al. | |
| 2011/0178919 A1 | 7/2011 | Parsons et al. | |
| 2011/0178957 A1 | 7/2011 | Parsons et al. | |
| 2011/0184844 A1 | 7/2011 | Parsons et al. | |
| 2012/0089496 A1 | 4/2012 | Taylor et al. | |
| 2012/0089497 A1 | 4/2012 | Taylor et al. | |
| 2012/0095893 A1 | 4/2012 | Taylor et al. | |
| 2012/0113987 A1* | 5/2012 | Riddoch | H04L 49/90 370/390 |
| 2012/0246052 A1 | 9/2012 | Taylor et al. | |
| 2013/0000700 A1 | 1/2013 | Lee | |
| 2013/0064096 A1* | 3/2013 | Degioanni | H04L 67/1097 370/241 |
| 2013/0194949 A1* | 8/2013 | Ruddick | H04L 43/028 370/252 |
| 2013/0347103 A1* | 12/2013 | Veteikis | H04L 43/04 726/22 |
| 2014/0280737 A1* | 9/2014 | Bicket | H04L 67/02 709/218 |
| 2014/0355606 A1* | 12/2014 | Riddoch | H04L 49/90 370/390 |
| 2014/0355613 A1* | 12/2014 | Pope | H04L 49/20 370/392 |

FOREIGN PATENT DOCUMENTS

| | | |
|---|---|---|
| WO | 0235838 A1 | 5/2002 |
| WO | 2008127672 A2 | 10/2008 |
| WO | 2009042919 A2 | 4/2009 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

Jack B. Dennis and Earl C. Van Horn; "Programming Semantics for Multiprogrammed Computations," Communications of the ACM, vol. 9, No. 3, pp. 143-155, Mar. 1966.

Marvin Zelkowitz; "Interrupt Driven Programming," Communications of the ACM, vol. 14, No. 6, p. 417-418, Jun. 1971.

J. Carver Hill; "Synchronizing Processors with Memory-Content-Generated Interrupts," Communications of the ACM, vol. 16, No. 6, p. 350-351, Jun. 1973.

F.F. Kuo; "The Aloha System," ACM Computer Communication Review, vol. 4, No. 1, pp. 5-8, Jan. 1974.

Vinton Cerf, Robert Kahn; "A Protocol for Packet Network Intercommunication," IEEE Transactions on Communications, vol. COM-22, No. 5, 13 pages, May 1974.

V. Cerf, et al.; "Proposal for an International End-to-End Protocol," ACM Computer Communication Review, vol. 6 No. 1, pp. 63-89, Jan. 1976.

Robert M. Metcalfe and David R. Boggs; "Ethernet: distributed packet switching for local computer networks," Communications of the ACM, vol. 19, Issue 7, pp. 395-404, Jul. 1976.

P. Kermani and L. Kleinrock; "Virtual cut-through: A new computer communciation switching technique," Computer Networks, vol. 3, No. 4, pp. 267-286, Sep. 1979.

John M. McQuillan, et al.; "An Overview of the New Routing Algorithm for the ARPANET," Proceedings of the 6th Data Communications Symposium, pp. 54-60, Nov. 1979.

Andrew D. Birrell, et al.; "Grapevine: An Exercise in Distributed Computing," Communications of the ACM, vol. 25, Issue 4, pp. 260-274, Apr. 1982.

Ian M. Leslie, et al.; "The Architecture of the Universe Network," ACM Computer Communication Review, vol. 14, No. 2, pp. 2-9, Jun. 1984.

John Nagle; "Congestion Control in IP/TCP Internetworks," ACM Computer Communication Review, vol. 14, No. 4, p. 11-17, Oct. 1984.

Robert M. Brandriff, et al.; "Development of a TCP/IP for the IBM/370," ACM Computer Communication Review, vol. 15, No. 4, pp. 2-8, Sep. 1985.

C. Kline; "Supercomputers on the Internet: A Case Study," ACM Computer Communication Review, vol. 17, No. 5, pp. 27-33, Aug. 1987.

Christopher A. Kent, Jeffrey C. Mogul; "Fragmentation Considered Harmful," ACM Computer Communication Review, vol. 17, No. 5, pp. 75-87, Oct. 1987.

Gary S. Delp, et al.; "An Analysis of Memnet: An Experiment in High-Speed Shared-Memory Local Networking," ACM Computer Communication Review, vol. 18, No. 4, p. 165-174, Aug. 1988.

David R. Boggs, et al.; "Measured Capacity of an Ethernet: Myths and Reality," ACM Computer Communication Review, vol. 18, No. 4, pp. 222-234, Aug. 1988.

H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.

V. Jacobson; "Congestion Avoidance and Control," ACM Computer Communication Review, vol. 18, No. 4, pp. 157-173, Aug. 1988.

David D. Clark; "The Design Philosophy of the DARPA Internet Protocols," ACM Computer Communication Review, vol. 18, No. 4, pp. 102-111, Aug. 1988.

Paul V. Mockapetris, Kevin J. Dunlap; "Development of the Domain Name System," ACM Computer Communication Review, vol 18, No. 4, pp. 112-122, Aug. 1988.

Margaret L. Simmons and Harvey J. Wasserman; "Performance of the Cray-2 and Cray X-MP/416 Supercomputers," Proceedings of the 1988 ACM/IEEE conference on Supercomputing, pp. 288-295, Orlando, Florida; Nov. 12, 1988.

David A. Borman; "Implementing TCP/IP on a Cray computer," ACM Computer Communication Review, vol. 19, No. 2, pp. 11-15, Apr. 1989.

R. Braden, et al.; "Computing the Internet Checksum," ACM Computer Communication Review, vol. 19, No. 2, pp. 86-94, Apr. 1989.

David D. Clark, et al.; "An Analysis of TCP Processing Overhead," IEEE Communications Magazine, vol. 27, No. 6, pp. 23-29, Jun. 1989.

David R. Cheriton; "Sirpent: A High-Performance Internetworking Approach," ACM Computer Communication Review, vol. 19. No. 4, pp. 158-169, Sep. 1989.

Derek Robert McAuley; "Protocol Design for High Speed Networks," PhD Thesis, University of Cambridge, 104 pages, Sep. 1989.

Craig Partridge; "How Slow is One Gigabit Per Second ?," ACM Computer Communication Review, vol. 20, No. 1, pp. 44-53, Jan. 1990.

(56) References Cited

OTHER PUBLICATIONS

D. D. Clark and D. L. Tennenhouse; "Architectural Considerations for a New Generation of Protocols," ACM Computer Communication Review, vol. 20, No. 4, pp. 200-208, Sep. 1990.
Eric C. Cooper, et al,; "Protocol Implementation on the Nectar Communication Processor," ACM Computer Communication Review, vol. 20, No. 4, 10 pages, Sep. 1990.
Bruce S. Davie; "A Host-Network Interface Architecture for ATM," ACM Computer Communication Review, vol. 21, No. 4, pp. 307-315, Sep. 1991.
C. Brendan S. Traw, et al.; "A High-Performance Host Interface for ATM Networks," ACM Computer Communication Review, vol. 21, No. 4, pp. 317-325, Sep. 1991.
Ian Leslie and Derek R. McAuley; "Fairisle: An ATM Network for the Local Area," ACM Computer Communication Review, vol. 21, No. 4, pp. 327-336, Sep. 1991.
Mark Hayter, Derek McAuley; "The Desk Area Network," ACM Operating Systems Review, vol. 25, Issue 4, pp. 1-11, Oct. 1991.
Gregory G. Finn; "An Integration of Network Communication with Workstation Architecture," ACM Computer Communication Review, vol. 21, No. 5, 12 pages, Oct. 1991.
Greg Chesson; "The Evolution of XTP," Proceedings of the Third International Conference on High Speed Networking, pp. 1-10, Nov. 1991.
Michael J. Dixon; "System support for multi-service traffic," University of Cambridge Computer Laboratory Technical Report, No. 245, pp. 1-108, Jan. 1992.
Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.
Gene Tsudik; "Message Authentication with One-Way Hash Functions," ACM Computer Communication Review, vol. 22, No. 5, pp. 29-38, Oct. 1992.
Peter Steenkiste; "Analyzing Communication Latency using the Nectar Communication Processor," ACM Computer Communication Review, vol. 22, No. 4, pp. 199-209, Oct. 1992.
Paul E. McKenney and Ken F. Dove; "Efficient Demultiplexing of Incoming TCP Packets," ACM Computer Communication Review, vol. 22, No. 4, pp. 269-279, Oct. 1992.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
C. Traw and J. Smith; "Hardware/Software organization of a high performance ATM host interface," IEEE Journal on Selected Areas in Communications, pp. 1-22, Feb. 1993.
E. Ruetsche; "The Architecture of Gb/s Multimedia Protocol Adapter," ACM Computer Communication Review, vol. 23, No. 3, pp. 59-68, Jul. 1993.
Jonathan M. Smith and C. Brendan S. Traw; "Giving Applications Access to Gb/s Networking," IEEE Network, vol. 7, Issue 4, 14 pages, Jul. 1993.
Jeffrey R. Michel; "The Design and Evaluation of an Off-Host Communications Protocol Architecture," MSci Thesis, University of Virginia, 144 pages, Augsut 1993.
Mark David Hayter; "A Workstation Architecture to Support Multimedia," PhD Thesis, University of Cambridge, 111 pages, Sep. 1993.
Jonathan Kay and Joseph Pasquale; "The Importance of Non-Data Touching Processing Overheads in TCP/IP," ACM Computer Communication Review, vol. 23, No. 4, 10 pages, Oct. 1993.
W. E. Leland, et al.; "On the Self-Similar Nature of Ethernet Traffic," ACM Computer Communication Review, vol. 23, No. 4, pp. 183-193, Oct. 1993.
C. A. Thekkath, et al.; "Implementing Network Protocols at User Level," ACM Computer Communication Review, vol. 23, No. 4, pp. 64-132, Oct. 1993.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Matthias Kaiserswerth; "The Parallel Protocol Engine," IEEE/ACM Transactions in Networking vol. 1, Issue 6, pp. 650-663, Dec. 1993.
Chris Maeda, Brian Bershad; "Protocol Service Decomposition for High-Performance Networking," ACM Operating Systems Review, vol. 27, Issue 5, 12 pages, Dec. 1993.
Greg Regnier, et al.; ETA: Experience with an Intel Xeon Processor as a Packet Processing EngineIEEE Micro, vol. 24, No. 1, pp. 24-31, Jan. 1994.
J. Vis; "A Simple LAN Performance Measure," ACM Computer Communication Review, vol. 24, No. 1, pp. 7-11, Jan. 1994.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Stuart Wray, et al.; "The Medusa Applications Environment," Proceedings of the International Conference on Multimedia Computing and Systems, Boston, MA, 9 pages, May 1994.
Various forum members; "MPI: A Message-Passing Interface Standard," Message-Passing Interface Forum, University of Tennessee, Knoxville, 236 pages, May 5, 1994.
Raj K. Singh, et al.; "A Programmable Network Interface for a Message-Based Multicomputer," ACM Computer Communication Review, vol. 24, No. 3, pp. 8-17, Jul. 1994.
P. Druschel, et al.; "Experiences with a High-Speed Network Adaptor: A Software Perspective," ACM Computer Communication Review, vol. 24, No. 4, pp. 2-13, Oct. 1994.
Sally Floyd; "TCP and Explicit Congestion Notification," ACM Computer Communication Review, vol. 24, No. 5, p. 8-23, Oct. 1994.
A. Edwards, et al.; "User-Space Protocols Deliver High Performance to Applications on a Low-Cost Gb/s LAN," ACM Computer Communication Review, vol 24, No. 4, pp. 14-23, Oct. 1994.
L. S. Brakmo, et al.; "TCP Vegas: New Techniques for Congestion Detection and Avoidance," ACM Computer Communication Review, vol. 24, No. 4, pp. 24-35, Oct. 1994.
A. Romanow and S. Floyd; "The Dynamics of TCP Traffic over ATM Networks," ACM Computer Communication Review, vol. 24, No. 4, pp. 79-88, Oct. 1994.
R. J. Black, I. Leslie, and D. McAuley; "Experiences of Building an ATM Switch for the Local Area," ACM Computer Communication Review, vol. 24, No. 4, pp. 158-167, Oct. 1994.
Babak Falsafi, et al.; "Application-Specific Protocls for User-Level Shared Memory," Proceedings of the 1994 conference on Supercomputing, pp. 380-389, Washington D.C.; Nov. 14, 1994.
Mengjou Lin, et al.; "Performance of High-Speed Network I/O Subsystems: Case Study of A Fibre Channel Network," Proceedings of the 1994 conference on Supercomputing, Washington D.C.; pp. 174-183, Nov. 14, 1994.
Nanette J. Boden, et al,; "Myrinet: A Gigabit-per-Second Local-Area Network," Draft of paper published in IEEE Micro, vol. 15, No. 1, pp. 1-15, Nov. 16, 1994.
Thomas Sterling, et al.; "Beowolf: A Parallel Workstation for Scientific Computation," Proceedings of the 24th International Conference on Parallel Processing, pp. 1-4, Aug. 1995.
K. Kleinpaste, P. Steenkiste, B. Zill; "Software Support for Outboard Buffering and Checksumming," ACM Computer Communication Review, vol. 25, No. 4, pp. 87-98, Oct. 1995.
C. Partridge, J. Hughes, J. Stone; "Performance of Checksums and CRCS over Real Data," ACM Computer Communication Review, vol. 25, No. 4, pp. 68-76, Oct. 1995.
A. Edwards, S. Muir; "Experiences Implementing A High-Performance TCP In User-Space," ACM Computer Communication Review, vol. 25, No. 4, pp. 196-205, Oct. 1995.
J. C. Mogul; "The Case for Persistent-Connection HTTP," ACM Computer Communication Review, vol. 25, No. 4, pp. 299-313, Oct. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.

(56) References Cited

OTHER PUBLICATIONS

D. L. Tennenhouse, D. J. Wetherall; "Towards an Active Network Architecture," ACM Computer Communication Review, vol. 26, No. 2, pp. 5-18, Apr. 1996.
Paul Ronald Barham; "Devices in a Multi-Service Operatiung System," PhD Thesis, University of Cambridge, 142 pages, Jul. 1996.
Chi-Chao Chang, et al.; "Low-Latency Communication on the IBM RISC SYstem/6000 SP," Proceedings of the 1996 ACM/IEEE conference on Supercomputing, Pittsburgh, pp. 1-17, Nov. 17, 1996.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
O. Angin, et al.; "Report on the 5th IFIP Internation Workshop on Quality of Service (IWQOS 97)," ACM Computer Communication Review, vol. 27, No. 3, pp. 100-117, Jul. 1997.
Charles P. Thacker and Lawrence C. Stewart; "Firefly: a Multiprocessor Workstation," ACM Operating Systems Review, vol. 21, Issue 4, pp. 164-172, Oct. 1987.
Ed Anderson, et al.; "Performance of the CRAY T3E Multiprocessor," Proceedings of the 1997 ACM/IEEE conference on Supercomputing, pp. 1-17, San Jose, California, Nov. 16, 1997.
Harvey J. Wassermann, et al.; "Performance Evaulation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
S. L. Pope, et al.; "Enhancing Distributed Systems with Low-Latency Networking," Parallel and Distributed Computing and Networks, Brisbane, Australia, pp. 1-12, Dec. 1998.
M. de Vivo, et al.; "Internet Vulnerabilities Related to TCP/IP and T/TCP," ACM Computer Communication Review, vol. 29, No. 1, pp. 81-85, Jan. 1999.
M. Allman; "TCP Byte Counting Refinements," ACM Computer Communication Review, vol. 29, No. 3, pp. 14-22, Jul. 1999.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Jonathan Stone, Craig Partridge; "When the CRC and TCP Checksum Disagree," ACM Computer Communication Review, vol. 30, No. 4, 11 pages, Oct. 2000.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Ian Pratt and Keir Fraser; "Arsenic: A User-Accessible Gigabit Ethernet Interface," Proceedings of IEEE Infocom 2001, pp. 1-11; Apr. 22, 2001.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Bruce Lowekamp, et al.; "Topology Discovery for Large Ethernet Networks," ACM Computer Communication Review, vol. 31, No. 4, pp. 237-248, Oct. 2001.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
Robert Ross, et al.; "A Case Study in Application I/O on Linux Clusters," Proceedings of the 2001 ACM/IEEE conference on Supercomputing, Denver, CO, 17 pages, Nov. 10, 2001.
E. Blanton and M. Allman; "On Making TCP More Robust to Packet Reordering," ACM Computer Communication Review, vol. 32, No. 1, pp. 20-30, Jan. 2002.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Jon Crowcroft, Derek McAuley; "ATM: A Retrospective on Systems Legacy," ACM Computer Communication Review, vol. 32, No. 5, pp. 11-21, Nov. 2002.
Charles Kalmanek; "A Retrospective View of ATM," ACM Computer Communication Review, vol. 32, No. 5, pp. 13-19, Nov. 2002.
Jonathan Smith; "The Influence of ATM on Operating Systems," ACM Computer Communication Review, vol. 32, No. 5, pp. 29-37, Nov. 2002.
NR Adiga, et al.; "An Overview of the BlueGene/L Supercomputer," Proceedings of the 2002 ACM/IEEE conference on Supercomputing, pp. 1-22, Baltimore; Nov. 16, 2002.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
R. Bush, D. Meyer; "Some Internet Architectural Guidelines and Philosophy," IETF Network Working Group, Request for Comments: 3439, pp. 1-25, Dec. 2002.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Tom Kelly; "Scalable TCP: Improving Performance in Highspeed Wide Area Networks," ACM Computer Communication Review, vol. 33, No. 2, pp. 83-91, Apr. 2003.
Jeffrey C. Mogul; "TCP offload is a dumb idea whose time has come," Proceedings of HotOS IX: The 9th Workshop on Hot Topics in Operating Systems, pp. 26-30, May 18, 2003.
Derek McAuley, Rolf Neugebauer; "A case for Virtual Channel Processors," Proceedings of the ACM SIGCOMM 2003 Workshops, pp. 237-242, Aug. 2003.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
Vinay Aggarwal, et al.; "Workshop on network-I/O convergence: experience, lessons, implications (NICELI)," ACM Computer Communication Review, vol. 33, No. 5, pp. 75-80, Oct. 2003.
Wu-chun Feng, et al.; "Optimizing 10-Gigabit Ethernet for Networks ofWorkstations, Clusters, and Grids: A Case Study," Proceedings of the 2003 ACM/IEEE conference on Supercomputing, Phoenix, Arizona, 13 pages, Nov. 15, 2003.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.

(56) References Cited

OTHER PUBLICATIONS

Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Cheng Jin, et al.; "FAST TCP: Motivation, Architecture, Algorithms, Performance," Proceedings of IEEE Infocom 2004, 21 pages, Mar. 7, 2004.
Andy Currid; "TCP Offload to the Rescue," ACM Queue, vol. 2, No. 3, pp. 58-65, May 1, 2004.
Greg Regnier, et al.; "TCP Onloading for Data Center Servers," Computer, IEEE Computer Society, vol. 37, No. 11, pp. 48-58, Nov. 2004.
Gregory L. Chesson; "Declaration of Dr Gregory L Chesson in *Alacritech* v. *Microsoft*," United States District Court, Northern District California, San Francisco Division, 289 pages, Feb. 4, 2005.
Edward D. Lazowska, David A. Patterson; "Computing Research: A Looming Crisis," ACM Computer Communication Review, vol. 35, No. 2, 2005, pp. 65-68, Jul. 2005.
W. Feng, et al.; "Performance Characterization of a 10-Gigabit Ethernet TOE," Proceedings of the 13th Symposium on High Performance Interconnects, pp. 1-6, Aug. 17, 2005.
B. Leslie, et al.; "User-level device drivers: Achieved performance," J. Comput. Sci. & Technol., vol. 20, pp. 1-17, Sep. 2005.
P. Balaji, et al.; "Head-to-Toe Evaluation of High-Performance Sockets Over Protocol Offload Engines," Proceedings of the IEEE International Conference on Cluster Computing, 2005, pp. 1-10, Sep. 2005.
Humaira Kamal, et al.; "SCTP versus TCP for MPI," Proceedings of the 2005 ACM/IEEE conference on Supercomputing, Seattle, Washington, 14 pages, Nov. 12, 2005.
Sumitha Bhandarkar, et al.; "LTCP: Improving the Performance of TCP in Highspeed Networks," ACM Computer Communication Review, vol. 36, No. 1, pp. 41-50, Jan. 2006.
H. K. Jerry Chu; "Zero-Copy TCP in Solaris," Proceedings of the USENIX Annual Technical Conference, 13 pages, Jan. 1996.
Ken Calvert; "Reflections on Network Architecture: an Active Networking Perspective," ACM Computer Communication Review, vol. 36, No. 2, pp. 27-30, Apr. 2006.
Jon Crowcroft; "10 Networking Papers: Recommended Reading," ACM Computer Communication Review, vol. 36, No. 2, pp. 31-32, Apr. 2006.
Greg Minshall, et al.; "Flow labelled IP over ATM: design and rationale ," ACM Computer Communication Review, vol. 36, No. 3, pp. 79-92, Jul. 2006.
David Wetherall; "10 Networking Papers: Readings for Protocol Design," ACM Computer Communication Review, vol. 36, No. 3, pp. 77-78, Jul. 2006.
Patrick Geoffray; "A Critique of RDMA," HPCWire article: http://www.hpcwire.com/features/17886984.html, 7 pages, Aug. 18, 2006.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Steven Pope, David Riddoch; "10Gb/s Ethernet Performance and Retrospective," ACM Computer Communication Review, vol. 37, No. 2, pp. 89-92, Mar. 19, 2007.
Kieran Mansley, et al.; "Getting 10 Gb/s from Xen," Euro-Par Conference 2007, Rennes, France, 10 pages, Aug. 28, 2007.
M. Kaiserswerth; "The Parallel Protocol Engine," IEEE/ACM Transactions in Networking vol. 1, Issue 6, pp. 650-663, Dec. 1993.
Danny Cohen, et al.; "Use of message-based multicomputer components to construct gigabit networks," ACM Computer Communication Review, vol. 23, No. 4, p. 32-44, Jul. 1993.
J. Evans and T. Buller; "The End of History," IEEE TCGN Gigabit Networking Workshop, 10 pages, Apr. 22, 2001.
M.V. Wilkes and R.M. Needham; "The Cambridge Model Distributed System," ACM SIGOPS Operating Systems Review, vol. 14, Issue 1, pp. 21-29, Jan. 1980.
Geoffray, P., "Protocol Off-Loading vs On-Loading in High-Perfomance Networks," Hot Interconnects 2006, 14th Symposium on High Performance Interconnects, Aug. 23, 2006, 5 pages.
Dickman, L., "Protocol OffLoading vs OnLoading in High Performance Networks," Hot Interconnects Panel, 14th Symposium on High Performance Interconnects, Aug. 23, 2006, 7 pages.
Petrini, F., "Protocol Off-Loading vs On-Loading in High-Performance Networks," Hot Interconnects 2006, 14th Symposium on High Performance Interconnects, Aug. 23, 2006, 4 pages.
Reginer, G., "Protocol Onload vs. Offload," Hot Interconnects 2006, 14th Symposium on High Performance Interconnects, Aug. 23, 2006, 1 page.
Montry, G., "Open Fabrics Alliance," www.openfabrics.org, Hot Interconnects 2006, 14th Symposium on High Performance Interconnects, Aug. 23, 2006, 8 pages.
EP-14170500.4—Extended European Search Report dated Sep. 10, 2014 (5 pages).
"Embedded Packet Capture Configuration Guide," IOS XE Release 3S (Cisco ASR 1000), Cisco Sytems, Inc. (Dec. 2012), 14 pages.
"A Guide to Building High Performance Capture and Replay Appliances," Napatech (Apr. 2012), 7 pages.

* cited by examiner

PACKET CAPTURE

CROSS REFERENCE TO OTHER APPLICATIONS

This application claims the benefit of prior U.S. Provisional Patent Application No. 61/829,145, filed 30 May 2013, entitled "PACKET CAPTURE," by Steve L. Pope, David J. Riddoch and Martin Porter, which application is incorporated herein by reference in its entirety.

BACKGROUND

This invention relates to network interface devices for performing packet capture at a host data processing system.

Packet capture is an important tool for network management and is used for many monitoring and troubleshooting purposes. With increasingly many applications, especially those in financial services, operating with very aggressive quality of service and jitter requirements, packet capture can provide a means of performing application level performance tuning and diagnostics by recording a log of packet activity on application data flows. Packet capture can further satisfy the requirements of regulatory compliance that exist in financial services, such as the logging of trading messages to and/or from a server.

Packet capture commonly requires hardware timestamp support, especially if a precision of tens of nanoseconds is to be achieved, which in turn requires the use of network time synchronisation protocols such as IEEE 1588 v2. Furthermore, the high speeds of modern networks (such as 1, 10 or 40 GbE) has resulted in the development of dedicated hardware packet capture devices for performing packet capture of received data flows by processing received data packets into a standard format logfile, such as PCAP. For example, Napatech's network analysis adaptors support high speed packet capture at up to 20 Gb/s. However, such devices terminate the network flows they receive and therefore rely on the network architecture itself to be configured to provide duplicate data flows to the packet capture devices. This is conventionally achieved through the use of high speed switches (e.g. via a spanning port) arranged to duplicate the data flows which a packet capture device is intended to capture. The parent data flow from which the duplicate flow is made is delivered to the appropriate endpoint in the normal manner. Furthermore, dedicated packet capture devices that stream capture data into host memory typically rely on a complex interface to the host which is primarily concerned with supporting the high data rates of the capture streams and does not guarantee uninhibited data flow for other applications supported at the capture system.

The conventional use of network switches to provide duplicate data flows for packet capture has several disadvantages:

i. it requires the use of expensive switches and the architecture of the network to be designed to ensure that the data flows to be captured are routed via the switches at which the data flows are to be duplicated—it can be particularly expensive to engineer a network such that all data flows are monitored at a packet capture device;

ii. since the duplicated data flow and its parent data flow take different paths through the network to their respective endpoints, the packet capture device does not measure the jitter for the parent data flow downstream from the switch, which is in fact the data flow intended to be monitored;

iii. furthermore, because the parent and duplicate data flows take different paths, the packet capture device actually measures the jitter experienced by the duplicate data flow, which can include contributions from the network fabric downstream from the switch on the path of the duplicate data flow;

iv. packet capture devices are a point of traffic aggregation in a network and must therefore make use of high end link technologies if they are to cope with the convergence of many data flows in a high volume network—this makes conventional packet capture devices expensive.

Some switches, such as Cisco's IOS switches supporting Embedded Packet Capture, provide the ability to perform packet capture at the switch itself. However, this does not address problems (i), (ii) or (iv) and requires the captured data to be streamed across a network for storage, which can itself lead to increased jitter and congestion on the links supporting the monitored data flows.

There is therefore a need for an improved packet capture device that addresses one or more of these problems.

SUMMARY

According to a first aspect of the present invention there is provided a network interface device for connection between a host data processing device supporting a consumer process and a network, the network interface device comprising:

a data bus interface;

a controller for supporting communication with a host data processing device over the data bus interface; and a packet capture unit located between the controller and the network and comprising:

a packet inspector configured to parse incoming data packets so as to identify data packets belonging to a first data flow;

a duplication engine configured to generate a duplicate data flow from the first data flow; and a packet capture engine configured to process said duplicate data flow into a packet capture data stream having a predefined format;

wherein the network interface device is configured to cause:

the first data flow to be made available to a consumer process of a host data processing device to which the network interface device is connected; and the processed packet capture data stream to be stored at a packet capture buffer.

Preferably the packet capture buffer is supported at the network interface device.

Suitably the controller is arranged to make available the first data flow to a consumer process by:

identifying an endpoint representing a corresponding consumer process accessible over the data bus interface; and delivering over the data bus interface data of the first data flow addressed to said identified endpoint.

Preferably the packet capture unit is arranged to make available the processed packet capture data to the controller for delivery to an endpoint accessible over the data bus interface. Preferably the processed packet capture data is assigned a lower priority than data of the first data flow and the controller is configured to enforce a quality of service protocol such that the processed packet capture data is delivered over the data bus interface between data of the first data flow. Preferably the controller is configured to deliver data of the first data flow over the data bus interface when the data bus interface is otherwise quiescent.

Suitably the network interface device further comprises interconnect logic for connection to a storage subsystem, the packet capture unit being configured to deliver the processed packet capture data stream to the interconnect logic for storage at the storage subsystem, the data path between the packet capture unit and the interconnect logic not including the controller.

Suitably the packet capture unit is arranged to deliver the processed packet capture data stream onto the network over a data path that does not include the controller. Preferably the processed packet capture data is assigned a lower priority than data of the first data flow and the packet capture unit is configured to enforce a quality of service protocol such that the processed packet capture data is delivered onto the network between data of any outgoing data flows.

Preferably the packet capture unit further comprises a data store including one or more triggers, the packet inspector being configured to parse incoming data packets by matching said one or more triggers to each received data packet so as to identify data packets belonging to the first data flow. Suitably the one or more triggers include a regular expression over at least a portion of incoming data packets.

The network interface device preferably further comprises timestamping apparatus configured to, on each data packet of the first data flow being received at the network interface device, generate a timestamp, each such timestamp being included in the processed packet capture data stream by the packet capture engine.

Suitably the processing of said duplicate data flow into a packet capture data stream by the packet capture engine includes performing data compression.

Preferably the packet capture unit is a reconfigurable logic device such as an FPGA. Suitably the packet inspector, duplication engine and packet capture engine are defined by one or more firmware modules installed at the reconfigurable logic device.

According to a second aspect of the present invention there is provided a data processing system comprising:
a network interface device according to the first aspect of the present invention; and
a host data processing device having a plurality of processing cores, a memory subsystem and being coupled to the network interface device by means of a data bus, the host data processing device supporting said consumer process and a packet capture process arranged to support a host packet capture buffer;
wherein the consumer process and the packet capture process are supported at different processing cores of the host data processing device.

Preferably the packet capture process is a user level process supporting the host packet capture buffer in its address space, the network interface device being arranged to deliver the processed packet capture data stream over the data bus by means of direct memory access.

The data processing system preferably further comprises a user level protocol processing engine, the packet capture unit being configured to pass the processed packet capture data stream to a controller of the network interface device as a series of data packets for delivery to an endpoint associated with the user level protocol processing engine.

Preferably the packet capture process is arranged to, in a first mode, service one or more receive queues associated with said endpoint so as to read data of the processed packet capture data stream into the host packet capture buffer.

Preferably the packet capture process is arranged to, in a second mode, read processed packet capture data including timestamp information from the host packet capture buffer and cause the packet capture unit to enter a replay mode in which it:
receives the read processed packet capture data from the packet capture process;

reforms the read processed packet capture data into a reformed sequence of data packets and associated timestamp information representative of a corresponding sequence of received data packets of the first data flow; and
causes the reformed sequence of data packets to be delivered to the host by means of the controller according to a schedule commensurate with the relative receive time intervals indicated by the associated timestamp information.

Suitably the packet capture unit further includes a replay unit configured to perform at least the reforming step of the replay mode.

Preferably, if the read processed packet capture data at the packet capture buffer does not allow the payload data of the corresponding sequence of received data packets of the first data flow to be entirely reformed, the packet capture unit is configured to generate the reformed sequence of data packets using one or more predetermined test patterns in the place of any missing payload data.

Preferably the packet capture process is arranged to cause at least some of the packet capture data to be delivered to a buffer of the network interface device prior to the packet capture unit being caused to enter its replay mode.

According to a third aspect of the present invention there is provided a network interface device for connection between a host data processing device and a network, the network interface device comprising:
a data bus interface;
a controller for supporting communication with a host data processing device over the data bus interface; and
a packet capture unit located between the controller and the network and comprising:
a packet inspector configured to parse outgoing data packets so as to identify data packets belonging to a first data flow;
a duplication engine configured to generate a duplicate data flow from the first data flow; and
a packet capture engine configured to process said duplicate data flow into a packet capture data stream having a predefined format;
wherein the network interface device is configured to cause:
the first data flow to be transmitted onto a network to which the network interface device is connected; and
the processed packet capture data stream to be stored at a packet capture buffer.

Preferably the packet capture unit is arranged to deliver the processed packet capture data stream onto the network over a data path that does not include the controller.

Preferably the processed packet capture data is assigned a lower priority than data of the first data flow and the packet capture unit is configured to enforce a quality of service protocol such that the processed packet capture data is delivered onto the network between data of the first data flow.

According to a fourth aspect of the present invention there is provided a data processing system comprising:
a network interface device according to the third aspect of the present invention; and
a host data processing device having a plurality of processing cores, a memory subsystem and being coupled to the network interface device by means of a data bus, the host data processing device supporting a source process from which data of the first data flow originates and a packet capture process arranged to support a host packet capture buffer;
wherein the source process and the packet capture process are supported at different processing cores of the host data processing device.

Preferably the packet capture process is a user level process supporting the host packet capture buffer in its address space, the network interface device being arranged to deliver the processed packet capture data stream over the data bus by means of direct memory access.

The data processing system preferably further comprises a user level protocol processing engine, the packet capture unit being configured to pass the processed packet capture data stream to a controller of the network interface device as a series of data packets for delivery to an endpoint associated with the user level protocol processing engine.

Preferably the packet capture process is arranged to, in a first mode, service one or more receive queues associated with said endpoint so as to read data of the processed packet capture data stream into the host packet capture buffer.

Preferably the packet capture process is arranged to, in a second mode, read processed packet capture data including timestamp information from the host packet capture buffer and cause the packet capture unit to enter a replay mode in which it:

receives the read processed packet capture data from the packet capture process;

reforms the read processed packet capture data into a reformed sequence of data packets and associated timestamp information representative of a corresponding sequence of received data packets of the first data flow; and transmits the reformed sequence of data packets onto the network at the relative time intervals indicated by the associated timestamp information.

Suitably the packet capture unit further includes a replay unit configured to perform at least the reforming step of the replay mode.

BRIEF DESCRIPTION OF THE DRAWINGS

The present invention will now be described by way of example with reference to the accompanying drawings, in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to network interface devices for performing packet capture at a host data processing system. A network interface device as described herein could be provided in any suitable form, including as a peripheral device or integrated with the hardware of a host data processing device. A data processing device could be any kind of computer system, including a server, personal computer, or a bespoke processing unit. A network interface device as described herein provides an interface to a network for use by its host data processing device.

Figure 1:
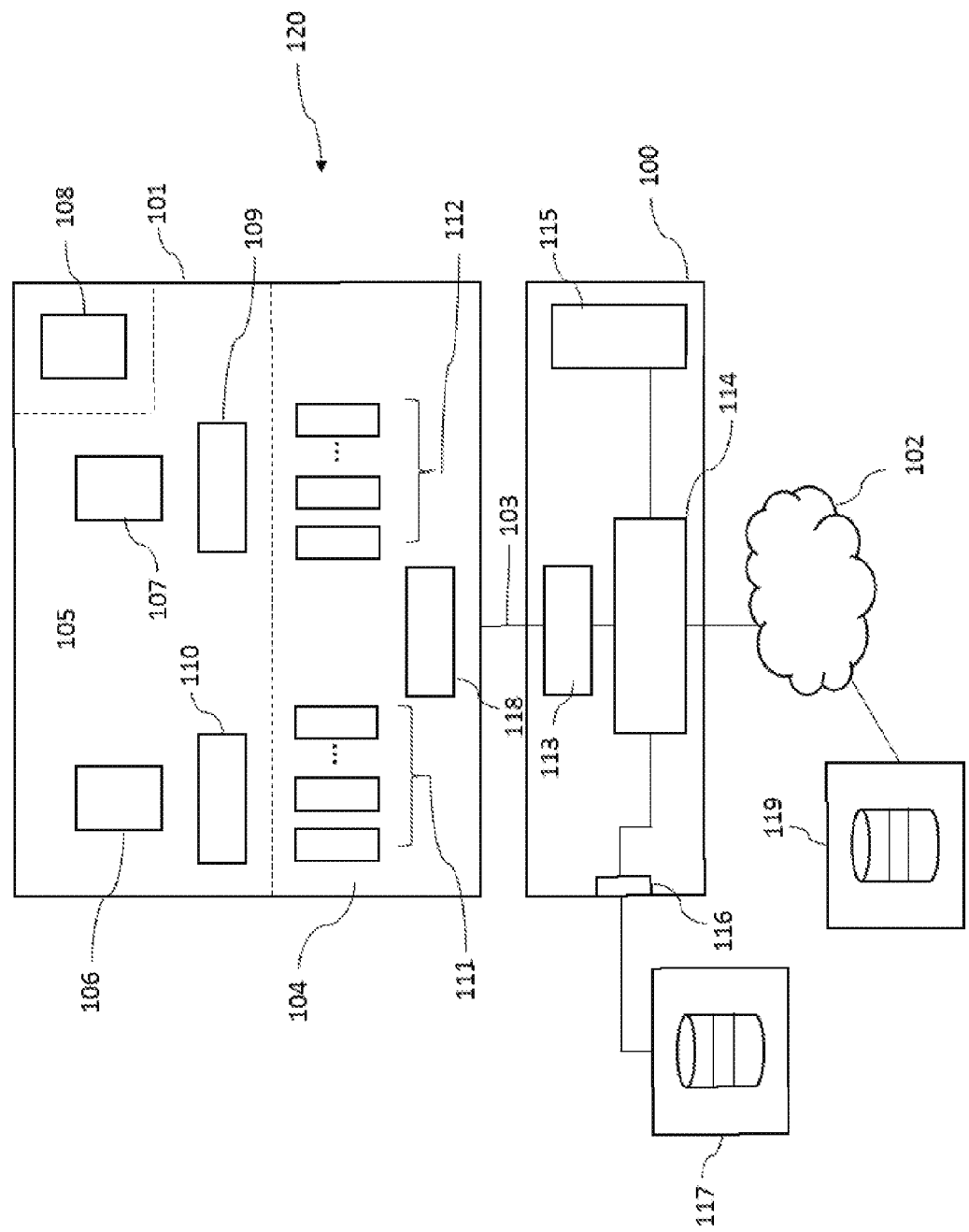
FIG. 1 is a schematic diagram of a data processing system configured in accordance with the present invention.

A schematic diagram of a data processing system configured in accordance with the present invention is shown in FIG. 1. Data processing system 120 comprises a network interface device 100 and a host data processing device 101 coupled together by means of a data bus 103. Network interface device 100 provides access to network 102 for the data processing device.

Data processing device 101 preferably supports a software environment comprising kernel space 104 and user level space 105. The kernel would typically support a network protocol stack 118 for performing processing of network data packets communicated over the network interface device, along with communication queues 111 and 112 for receiving incoming data and/or holding data for transmission over the network. User space 105 supports at least one application 106 arranged to communicate data over the network interface device. For example, application 106 might be one or both of a consumer of an incoming data flow and a source for an outgoing data flow. Preferably user space further supports a packet capture application 107 whose function will be later described.

One or both of application 106 and packet capture application 107 could be provided with a user level protocol processing engine 110/109. Most preferably user level stacks 110 and 109 would be provided in the respective address spaces of applications 106 and 107, but in less preferred embodiments this need not be the case and applications 106 and 107 could share a single user level stack 110 or 109. One or more of communication queues 111/112 could be located in user space 105 but preferably the communication queues corresponding to the network endpoints supported by a user level stack would be located in kernel space and memory mapped into the address space of the respective user level stack.

As is conventional, network interface device comprises a controller 113 for supporting communication with data processing device 101 over data bus 103. The controller is configured to match network data flows to their respective endpoints supported at data processing device 101 (e.g. a queue pair of communication queues 111/112). Preferably controller 113 includes a DMA manager for supporting direct memory access over data bus 103 with the communication queues 111/112 held at the memory subsystem of host device 101.

In accordance with the present invention, network interface device 100 further includes a packet capture unit 114 for capturing data packets sent or received over the network interface device. Packet capture unit 114 is provided between network 102 and controller 113 such that network data flows terminating at data processing device 101 pass through the packet capture unit. Packet capture unit 114 is configured to capture data packets received or transmitted over one or more specified data flows and process the captured data packets into a stream of packet capture data having a predefined format (e.g. PCAP).

The packet capture data stream is stored at a packet capture buffer, which could be located, to give four examples, at buffer 115 on the network interface device, at buffer 108 at the host device, at external storage 117, or at network storage 119. All four buffers 115, 108, 117 and 119 are shown in FIG. 1 for completeness only and in a given system 120, one, two, three or all four of buffer 115, buffer 108, buffer 117 and buffer 119 might be present. Buffer 115 could be any kind of data store at the network interface device, and could be provided at the packet capture unit itself. Buffer 108 is a data store maintained at the host by packet capture software 107 and would be located at a memory subsystem of the host device, such as RAM, a solid state memory, hard disk or other storage unit. Buffer 117 is a storage device (e.g. a solid state memory or hard disk) external to the network interface device but connected directly to the network interface device by means of optional interconnect 116 such that packet capture data is not written to the buffer over host device 101. Buffer 119 is a network entity comprising a data store for supporting a packet capture buffer and is accessible to packet capture unit 114 over network 102. Because capture unit 114 is located between the controller and the network, capture data can be sent back out onto the network without passing through the controller and influencing data flows to/from the host.

Other buffer locations are envisaged and the four locations described herein are given by way of example only. As will become apparent, the architecture proposed by the present invention means that the location of the buffer at which packet capture data is stored is of lesser importance than with prior art packet capture systems.

Preferably packet capture data stream is at least initially stored at buffer 115 or buffer 117 since these locations allow the packet capture unit to stream the capture data into the buffer without introducing latency and jitter into the communication of data to and from the network interface device over data bus 103 or network 102.

It is advantageous if packet capture unit 114 is configured to provide a network interface to both network 102 and controller 113 such that controller communicates with the packet capture unit by means of flows of network data packets. This allows a conventional NIC controller 113 to be used. Preferably the controller and packet capture unit are each provided with a media access control (MAC) unit so as to permit logically-formed data packets to pass between the two. Any suitable physical layer could be provided between the controller and packet capture unit. Preferably only the packet capture unit would be provided with a network PHY between it and the network in order to support the physical signalling of data packets over the network.

In any embodiment of the present invention the packet capture unit could be physically and/or electrically integrated with the controller. For example, the packet capture unit and controller could be co-located on the same integrated circuit/die or provided on separate integrated circuits/dies within the same package.

The operation of the packet capture unit will now be described in more detail with reference to FIGS. 2 and 3.

Figure 2:
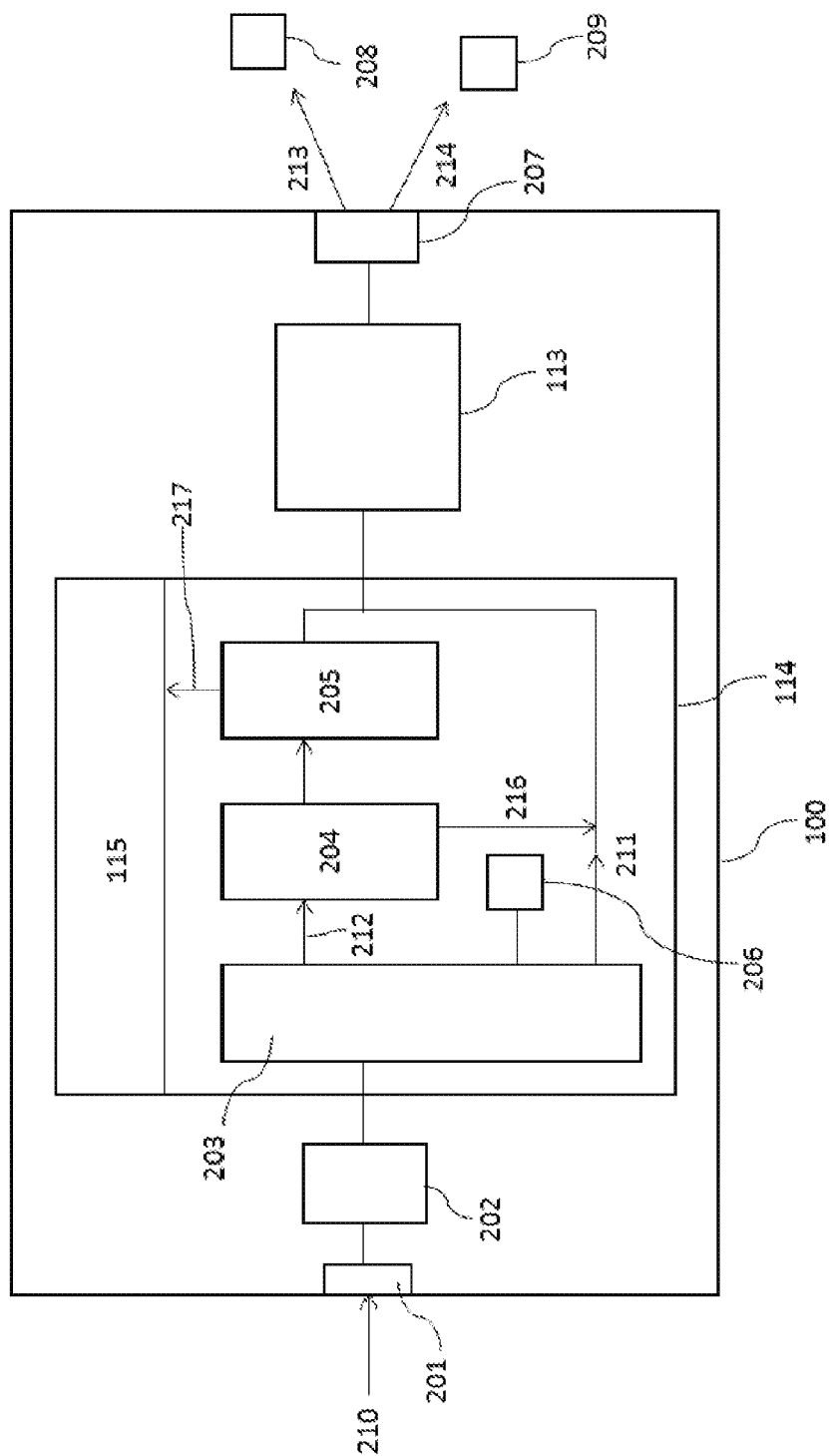
FIG. 2 is a schematic diagram of a network interface device configured in accordance with the present invention illustrating packet capture on the receive path.

FIG. 2 schematically illustrates packet capture on the receive path of a network interface device (NIC) configured in accordance with the present invention. NIC 100 receives network data flows 210 at physical interface 201 (e.g. a network PHY). On receiving each data packet, timestamp unit 202 records the precise time at which each data packet is received and forms a timestamp representing this information. Each timestamp represents metadata for the respective data packet and can be, for example, written or appended to that packet, or provided separately to the packet capture unit. As is known in the art, through the use of clock synchronization protocols such as IEEE 1588 v2 to synchronize the oscillator used by the hardware timestamp, a time resolution of tens of nanoseconds is possible with hardware timestamp units. Timestamp unit 202 preferably forms part of packet capture unit 114 but could alternatively be provided between the packet capture unit and the network interface device.

Packet capture unit 114 captures one or more specified data flows received from the network through the use of a packet inspector 203, a duplication engine 204 and a packet capture engine 205 (whose functionality may be achieved at the packet capture unit by one or more physical units). Packet inspector 203 is configured to parse incoming data flows in order to identify data packets belonging to one or more specified data flows. This is preferably accomplished by arranging the packet inspector to match each received data packet against a set of one or more triggers in order to identify data packets of the specified data flows. The triggers therefore identify to the packet inspector the data flows that are to be captured. The triggers could be stored at a data store 206 of the packet capture unit. Preferably the triggers are regular expressions over packet contents.

Data packets for which no match is found are passed in stream 211 to controller 114 for delivery in the conventional manner to their respective endpoints at the host device. Data packets that are identified as belonging to one of the specified data flows are passed in stream 212 to duplication engine 204 which duplicates the specified data flows, passing the first of each data packet over stream 216 to be delivered to its respective endpoint at the host device and the second of each data packet onto packet capture engine 205. Packet capture engine 205 is configured to process each of the second data packets of the specified data flows in order to form packet capture data of a predetermined format (e.g. PCAP).

Packet capture engine transforms the duplicate data flows in accordance with the predetermined format by, for example, performing lossless or lossy compression of data packet payloads and/or headers. The packet capture engine further includes in the packet capture data the timestamp information generated for each data packet. Preferably the timestamp unit 202 and packet inspector 203 are arranged to include the timestamps for the specified data flows in data stream 212 (e.g. the timestamps could be written/appended to the packets).

Packet capture unit 114 is preferably a reconfigurable logic device, such as an FPGA, with packet inspector 203, duplication engine 204 and packet capture engine 205 being functional components defined at the reconfigurable logic device by one or more firmware modules. Other applications could co-exist at the reconfigurable logic device, for example line-arbitration, financial symbol filtering, compression or encryption applications.

The stream of packet capture data generated at the packet capture engine is stored at a packet capture buffer. In the example shown in FIG. 2, capture streams 217 are delivered to buffer 115 at the network interface device (which may or may not be part of the packet capture unit). Preferably the packet capture unit is configured to provide a different capture stream for each of the specified data flows for storage at a different packet capture buffer of buffer 115. In preferred embodiments of the present invention, buffer 115 comprises RAM external to the packet capture unit at the NIC, the buffer supporting the packet capture buffers. In alternative embodiments, the capture buffer could be located at a storage device directly connected to the network interface device—for example, at a solid state disk (SSD) connected by means of a SATA interface.

If the capture buffers are not held at a buffer of the network interface device or a storage device 117 directly connected to the NIC, the packet capture engine is arranged to cause the capture streams 217 to be delivered to the appropriate endpoint at the host or network. Thus, if capture buffers are maintained at the host device, the capture streams are delivered over data bus interface 207 into the appropriate receive queues of the host device by means of controller 113. It is nonetheless advantageous if some caching of the capture streams is performed at the network interface device (e.g. at buffer 115) in order to allow the capture streams to be delivered at lower priority than the data flows to which the capture streams relate. This helps to minimise the introduction of latency or jitter into the data flows received at the host. For example, the capture streams could be delivered into capture buffers at the host when the data bus is quiescent.

If the capture buffers are maintained at a network entity 119 accessible over the network, the capture streams are delivered back onto the network over physical interface 201 for delivery to the appropriate network entity. This would require the packet capture data to be encapsulated as a stream of network data packets, which could be performed at the packet capture engine or at a subsequent processing functionality of the packet capture unit. The capture streams could be delivered to the controller for appropriate routing and transmission out onto the network on the transmit path, but preferably the capture unit is configured to push the capture streams directly out onto the network. Again, it is advantageous if some caching of the capture streams is performed at the network interface device (e.g. at buffer 115) in order to allow the capture data to be transmitted at lower priority than outgoing data flows. This helps to minimise the introduction of latency or jitter into the transmission and reception of network data flows at the network interface device.

A preferred embodiment of the present invention will now be described in which the network interface devices includes temporary buffer 115 for caching packet capture data streams formed at packet capture engine 205, the cached capture streams being subsequently delivered to host receive queues for storage at the capture buffers. The host data processing device includes a plurality of processing cores, including a first core 208 supporting a packet capture process and a second core 209 supporting a consumer application receiving at least one of the incoming data flows captured at the packet capture unit.

The packet capture unit is arranged to cause the cached capture streams to be delivered in stream 213 directed to the receive queues of the packet capture process at core 208. This can be achieved, for example, by encapsulating the capture data as a sequence of network frames addressed to the host endpoint corresponding to the packet capture process. This allows controller 113 to direct the capture streams to the appropriate endpoint by handling the encapsulated stream as regular network data packets (e.g. demuxing the encapsulated data packets onto the VNIC supporting the DMA queue pair of the packet capture software). Since the capture streams correspond to data flows for delivery to one or more consumers at the host, the network interface device is also configured to deliver the received data packets to the appropriate consumer processes. One such data flow is represented by flow 214 to the consumer process supported at core 209.

In order to minimise the introduction of latency and/or jitter into the received data flows, the data processing system is preferably configured to (a) deliver packet capture streams 213 over data bus interface 207 at a lower priority than data flows 214, and (b) arrange that the packet capture process consuming the packet capture streams is supported at a different processing core to the consumer process(es) of the corresponding data flows. By arranging that capture streams are transferred over data bus interface 207 when the data bus is not occupied delivering data flows to the host, the capture stream data is interleaved between the data flows so as to minimise any impact on the conventional flow of data to each consumer. By arranging that the packet capture and consumer processes are at different cores, switches in context between the processes are avoided that can result in delays at the software layer. This is particularly important in low latency applications, such as financial trading systems. Most prefer-ably, the packet capture process is supported at a core that does not support any consumer processes.

In order to minimise the receive processing performed at the host, it is advantageous to arrange that the capture data is delivered to the host in large frames, for example superpackets that could be larger than the maximum frame size normally permitted for the network protocol according to which the captured data packets are formed.

Whether buffer 115 supports the packet capture buffers or whether it merely caches packet capture streams prior to delivery to the packet capture buffers, buffer 115 could have sufficient capacity to hold the capture streams for a considerable time. For example, in a data processing system supporting a financial trading platform, buffer 115 could be sufficiently large to buffer an entire trading day. This has the advantage that the capture unit can wait until the end of the trading day before transferring the packet capture data into packet capture buffers or into longer term storage, and hence avoids introducing latency and jitter into the financial data flows being captured.

Host device preferably supports capture software 107 for configuring packet capture unit 114 and receiving capture streams from buffer 115 for storage at data store 108 (e.g. a non-volatile memory or storage device at the host system). Capture software 107 would therefore include the capture process supported at core 208 discussed above in relation to FIG. 2. The capture software therefore represents the endpoint for the capture streams delivered into its receive queues 112, with the capture process servicing the receive queues in order to receive the data into store 108. Preferably the capture software receives capture data by means of a user level protocol processing engine 109 configured as is known in the art so as to bypass the kernel stack 118 and avoid the use of interrupts, both of which are causes of latency and jitter at the software level.

In such an embodiment, encapsulated capture data held at buffer 115 is delivered by controller 113 as network frames to the receive queues 112 of capture software 107 that is supported at its own core of the system. The receive queues 112 preferably correspond to a VNIC defined at the NIC for the user level stack 109. The user level stack processes the frames carrying the capture data and make the capture data available to the capture software in the address space of which the user level stack resides. It is then up to the capture software to perform any required processing of the capture streams (perhaps to complete the formation of the capture streams into the predetermined format) and store the data at data store 108. This architecture allows capture data to be provided to capture software at the host and low latency and without disturbing data flows or consumer processes running at the host machine.

FIG. 2 relates to the capture of incoming data flows on the receive path of a NIC. The packet capture unit can be additionally or alternatively configured to perform packet capture on outgoing data flows.

Figure 3:
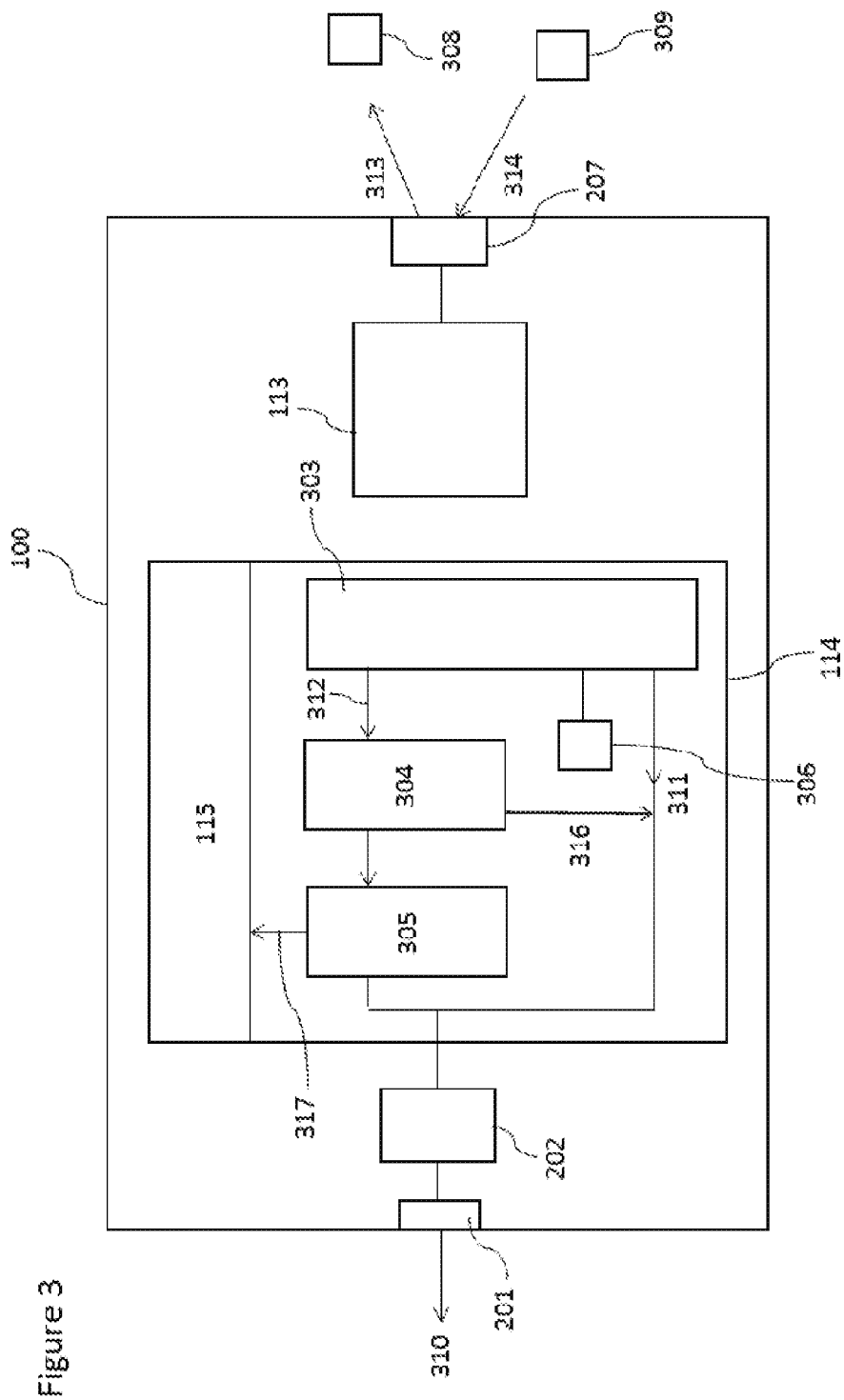
FIG. 3 is a schematic diagram of a network interface device configured in accordance with the present invention illustrating packet capture on the transmit path.

The transmit path of network interface device 100 is shown schematically in FIG. 3 and includes the packet capture unit 114. Again, packet capture unit comprise a packet inspector 303, a duplication engine 304 and a packet capture engine 305. These functional components of the capture unit could be the same functional components as their equivalents 203, 204 and 205 shown in FIG. 2, with incoming and outgoing data flows being parsed at the packet inspector so as to identify which incoming or outgoing streams are to be captured. In order to maintain the independence of the transmit and receive paths on a NIC it is preferable that components 303, 304 and 305 are provided in addition to 203, 204 and 205, and are dedicated to processing outgoing data flows on the transmit path.

Packet capture is performed in the same manner on a data flow whether it is incoming or outgoing. As described in relation to FIG. 2, data flows 312 identified at the packet inspector 303 as being for capture (potentially in dependence on a set of triggers stored at data store 306 identifying those flows) are duplicated at duplication engine 304, with the first flow passing to the packet capture engine for formation into a packet capture stream and the second flow 316 passing out onto the network with data flows 311 that are not identified as being for capture. Preferably the capture data formed at the capture engine 305 is written in stream 317 to buffer 115, potentially for storage at capture buffers located at buffer 115. Alternatively and as described in relation to FIG. 2, the capture buffers could be located elsewhere, such as at the host at data store 108, at a storage device 117 or at a network entity 119.

Packet capture software at the host for receiving and potentially processing packet capture data is preferably supported at a different processing core 308 of the host system to the source process(es) from which the captured data flows originate. Such a source process is supported at processing core 309 in FIG. 3. Data flows 314 originating from the source process are received at the NIC over data bus interface 207 and captured at the packet capture unit 114 in the manner described herein. The captured streams are at least temporarily cached at buffer 115 before being delivered in stream 313 to the capture process supported at processing core 308. It is advantageous if capture streams 313 are assigned a lower priority than data flows 314 so as to minimise any latency or jitter caused by the capture streams sharing the same data bus as the source data flows. Outgoing data flows 314, whether captured or not, are transmitted onto the network 310 by the network interface device in the conventional manner.

By arranging that the packet capture unit is located at the host device which terminates the data flows to be captured (i.e. the host supporting the source/consumer applications of the data flows), the capture streams provide an accurate record of the data flows to and from the host. The packet capture is performed at the point at which the data flows are processed and therefore the capture data represents a true reflection of packet timings: there is no false contribution specific to the capture data path, and the capture data is not missing any latency or jitter specific to the network path taken by the data flows. Furthermore, there is no requirement for expensive switches to provide duplicate data flows to dedicated packet capture units designed to cope with the high data rates resulting from the convergence of many data flows in the network. A network interface device configured in accordance with the present invention can be readily provided at each data processing system whose data flows are to be monitored, removing the need for careful network engineering and dedicated packet capture units remote from the system supporting the endpoints of the monitored data flows.

It should be noted that even in the event that packet capture streams generated by a NIC as described herein and delivered across a network to a remote network entity for storage (e.g. 119 in FIG. 1), the packet timings are captured at the host device and therefore do not suffer from the problems associated with providing separate parent data flow and capture streams within a network. Thus, in the system of the present invention, it is of limited consequence where the capture buffers are located. It is however advantageous for the NIC to support sufficient buffer space to allow the capture streams to be delivered from the NIC at times that minimise the impact of such data delivery on the data flows of the system (e.g. by assigning the capture streams a lower priority and enforcing quality of service protocols, or allowing delivery only when the relevant data bus or network interface is quiescent).

Capture data can be useful for several reasons: it can provide an audit trail for financial transactions performed by a trading platform; it can provide an additional layer of security by logging data flowing in or out of a server; it can allow data flows to be analysed asynchronously at greater fidelity than is possible in real time (e.g. for intrusion detection). Because capture data includes a precise record of the time at which data packets are sent/received, it can further be used to recreate conditions present on a network or at a particular entity. This can be useful to help optimise a network and for debugging network or application layer software.

A data processing system configured in accordance with the present invention can be arranged to replay capture data stored at a capture buffer in order to recreate the data flows represented by the capture data and cause the transmission of those data flows at the precise relative timings expressed in the capture data. For example, capture software 107 in FIG. 1 might be operable to cause capture data to be delivered back to capture unit 114 for recreation of the original data packets. If the packet capture data includes packet data compressed losslessly, the original packets can be recreated by decompressing the capture data. In the event that the format in which the packet capture data is stored involves lossy compression of packet data, missing sequences of data can be replaced by padding data in order to recreate data packets of the correct size (e.g. by predetermined patterns of data or random garbage that can be ignored at the receiver).

The decompression of capture data and formation of the original packets (or their proxies) is performed at the capture unit 114. This could be through re-tasking of the chain of packet inspector, duplication engine and packet capture engine, or a replay engine (not shown in the figures) could be provided at the capture unit for recreating data flows from capture data. For example, if the capture unit is a reconfigurable logic device, the replay engine could be a functionality defined in firmware. In its replay mode (in which its functional modules are re-tasked or its replay engine initialised), the packet capture unit is configured to generate flows of data packets from received capture data along with timing data indicating the relative times at which each packet is to be transmitted. The capture engine then pushes the data packets out onto the network in accordance with the indicated timings, hence precisely recreating the flows of data transmitted from the NIC at the time of capture.

For captured incoming data flows, replay of the capture data causes the capture engine to provide a precisely recreated stream of received data packets to the controller in accordance with the packet timings expressed in the capture data. The controller delivers the received data flows in its conventional manner so as to recreate the receive path conditions at the time of packet capture.

In order to avoid the NIC to transferring capture data over its interfaces whilst the replay of capture data is being performed, it is preferable if the capture software causes at least some of the capture data for replay to be transferred into buffer 115 at the NIC prior to the replay being initiated. This ensures that at least some of the required data is available at the NIC to the capture unit in advance of the network test and by providing a significant cache of the capture data at the NIC negates the impact of any delays or jitter on subsequent transfers of capture data to the NIC.

Note that the interconnections shown in figures are merely schematic and not necessarily indicative of actual connections between physical or logical components.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device for connection between a host data processing device supporting a consumer process and a network, the network interface device comprising:
   a data bus interface;
   a controller for supporting communication with a host data processing device over the data bus interface; and
   a packet capture unit located between the controller and the network and comprising:
      a packet inspector configured to parse incoming data packets so as to identify data packets belonging to a first data flow;
      a duplication engine configured to generate a duplicate data flow from the first data flow; and
      a packet capture engine configured to process said duplicate data flow into a packet capture data stream having a predefined format;
   wherein the network interface device is configured to cause:
      the first data flow to be made available to a consumer process of a host data processing device to which the network interface device is connected; and
      the processed packet capture data stream to be stored at a packet capture buffer.

2. The network interface device as claimed in claim 1, wherein the packet capture buffer is supported at the network interface device.

3. The network interface device as claimed in claim 1, wherein the controller is arranged to make available the first data flow to a consumer process by:
   identifying an endpoint representing a corresponding consumer process accessible over the data bus interface; and
   delivering over the data bus interface data of the first data flow addressed to said identified endpoint.

4. The network interface device as claimed in claim 1, wherein the packet capture unit is arranged to make available the processed packet capture data to the controller for delivery to an endpoint accessible over the data bus interface.

5. The network interface device as claimed in claim 4, wherein the processed packet capture data is assigned a lower priority than data of the first data flow and the controller is configured to enforce a quality of service protocol such that the processed packet capture data is delivered over the data bus interface between data of the first data flow.

6. The network interface device as claimed in claim 4, wherein the controller is configured to deliver data of the first data flow over the data bus interface when the data bus interface is otherwise quiescent.

7. The network interface device as claimed in claim 1, further comprising interconnect logic for connection to a storage subsystem, the packet capture unit being configured to deliver the processed packet capture data stream to the interconnect logic for storage at the storage subsystem, the data path between the packet capture unit and the interconnect logic not including the controller.

8. The network interface device as claimed in claim 1, wherein the packet capture unit is arranged to deliver the processed packet capture data stream onto the network over a data path that does not include the controller.

9. The network interface device as claimed in claim 8, wherein the processed packet capture data is assigned a lower priority than data of the first data flow and the packet capture unit is configured to enforce a quality of service protocol such that the processed packet capture data is delivered onto the network between data of any outgoing data flows.

10. The network interface device as claimed in claim 1, wherein the packet capture unit further comprises a data store including one or more triggers, the packet inspector being configured to parse incoming data packets by matching said one or more triggers to each received data packet so as to identify data packets belonging to the first data flow.

11. The network interface device as claimed in claim 10, wherein the one or more triggers include a regular expression over at least a portion of incoming data packets.

12. The network interface device as claimed in claim 1, further comprising timestamping apparatus configured to, on each data packet of the first data flow being received at the network interface device, generate a timestamp, each such timestamp being included in the processed packet capture data stream by the packet capture engine.

13. The network interface device as claimed in claim 1, wherein the processing of said duplicate data flow into a packet capture data stream by the packet capture engine includes performing data compression.

14. The network interface device as claimed in claim 1, wherein the packet capture unit is a reconfigurable logic device such as an FPGA.

15. The network interface device as claimed in claim 14, wherein the packet inspector, duplication engine and packet capture engine are defined by one or more firmware modules installed at the reconfigurable logic device.

16. A data processing system comprising:
   the network interface device as claimed in claim 1; and
   a host data processing device having a plurality of processing cores, a memory subsystem and being coupled to the network interface device by means of a data bus, the host data processing device supporting said consumer process and a packet capture process arranged to support a host packet capture buffer;
   wherein the consumer process and the packet capture process are supported at different processing cores of the host data processing device.

17. The data processing system as claimed in claim 16, wherein the packet capture process is a user level process supporting the host packet capture buffer in its address space, the network interface device being arranged to deliver the processed packet capture data stream over the data bus by means of direct memory access.

18. The data processing system as claimed in claim 17, further comprising a user level protocol processing engine, the packet capture unit being configured to pass the processed packet capture data stream to a controller of the network interface device as a series of data packets for delivery to an endpoint associated with the user level protocol processing engine.

19. The data processing system as claimed in claim 18, wherein the packet capture process is arranged to, in a first mode, service one or more receive queues associated with said endpoint so as to read data of the processed packet capture data stream into the host packet capture buffer.

20. The data processing system as claimed in claim 19, wherein the packet capture process is arranged to, in a second mode, read processed packet capture data including timestamp information from the host packet capture buffer and cause the packet capture unit to enter a replay mode in which it:
  receives the read processed packet capture data from the packet capture process;
  reforms the read processed packet capture data into a reformed sequence of data packets and associated timestamp information representative of a corresponding sequence of received data packets of the first data flow; and
  causes the reformed sequence of data packets to be delivered to the host by means of the controller according to a schedule commensurate with the relative receive time intervals indicated by the associated timestamp information.

21. The data processing system as claimed in claim 20, wherein the packet capture unit further includes a replay unit configured to perform at least the reforming step of the replay mode.

22. The data processing system as claimed in claim 20, wherein, if the read processed packet capture data at the packet capture buffer does not allow the payload data of the corresponding sequence of received data packets of the first data flow to be entirely reformed, the packet capture unit is configured to generate the reformed sequence of data packets using one or more predetermined test patterns in the place of any missing payload data.

23. The data processing system as claimed in claim 20, wherein the packet capture process is arranged to cause at least some of the packet capture data to be delivered to a buffer of the network interface device prior to the packet capture unit being caused to enter its replay mode.

24. A network interface device for connection between a host data processing device and a network, the network interface device comprising:
  a data bus interface;
  a controller for supporting communication with a host data processing device over the data bus interface; and
  a packet capture unit located between the controller and the network and comprising:
    a packet inspector configured to parse outgoing data packets so as to identify data packets belonging to a first data flow;
    a duplication engine configured to generate a duplicate data flow from the first data flow; and
    a packet capture engine configured to process said duplicate data flow into a packet capture data stream having a predefined format;
  wherein the network interface device is configured to cause:
    the first data flow to be transmitted onto a network to which the network interface device is connected; and
    the processed packet capture data stream to be stored at a packet capture buffer.

25. The network interface device as claimed in claim 24, wherein the packet capture unit is arranged to deliver the processed packet capture data stream onto the network over a data path that does not include the controller.

26. The network interface device as claimed in claim 25, wherein the processed packet capture data is assigned a lower priority than data of the first data flow and the packet capture unit is configured to enforce a quality of service protocol such that the processed packet capture data is delivered onto the network between data of the first data flow.

27. A data processing system comprising:
  the network interface device as claimed in claim 24; and
  a host data processing device having a plurality of processing cores, a memory subsystem and being coupled to the network interface device by means of a data bus, the host data processing device supporting a source process from which data of the first data flow originates and a packet capture process arranged to support a host packet capture buffer;
  wherein the source process and the packet capture process are supported at different processing cores of the host data processing device.

28. The data processing system as claimed in claim 27, wherein the packet capture process is a user level process supporting the host packet capture buffer in its address space, the network interface device being arranged to deliver the processed packet capture data stream over the data bus by means of direct memory access.

29. The data processing system as claimed in claim 28, further comprising a user level protocol processing engine, the packet capture unit being configured to pass the processed packet capture data stream to a controller of the network interface device as a series of data packets for delivery to an endpoint associated with the user level protocol processing engine.

30. The data processing system as claimed in claim 29, wherein the packet capture process is arranged to, in a first mode, service one or more receive queues associated with said endpoint so as to read data of the processed packet capture data stream into the host packet capture buffer.

31. The data processing system as claimed in claim 30, wherein the packet capture process is arranged to, in a second mode, read processed packet capture data including timestamp information from the host packet capture buffer and cause the packet capture unit to enter a replay mode in which it:
  receives the read processed packet capture data from the packet capture process;
  reforms the read processed packet capture data into a reformed sequence of data packets and associated timestamp information representative of a corresponding sequence of received data packets of the first data flow; and
  transmits the reformed sequence of data packets onto the network at the relative time intervals indicated by the associated timestamp information.

32. The data processing system as claimed in claim 31, wherein the packet capture unit further includes a replay unit configured to perform at least the reforming step of the replay mode.

33. The network interface device as claimed in claim 1, wherein the packet capture unit is arranged to deliver the processed packet capture data stream onto the network over a data path that does not include the controller.

* * * * *